US006278808B1

United States Patent
Tsai et al.

(10) Patent No.: US 6,278,808 B1
(45) Date of Patent: Aug. 21, 2001

(54) METHOD AND APPARATUS FOR OBTAINING RELATIVE AND ABSOLUTE MODIFYING FACTORS FOR IMAGE SCANNING APPARATUS

(75) Inventors: Jenn-Tsair Tsai; Bill Chen, both of Hsinchu (TW)

(73) Assignee: Mustek Systems, Inc. (TW)

( * ) Notice: Subject to any disclaimer, the term of this patent is extended or adjusted under 35 U.S.C. 154(b) by 0 days.

(21) Appl. No.: 09/239,407

(22) Filed: Jan. 28, 1999

(30) Foreign Application Priority Data

May 20, 1998 (TW) .................................. 87107861

(51) Int. Cl.[7] .............. G06K 9/00; G06K 9/32; H04N 1/00; H04N 1/04
(52) U.S. Cl. .................. 382/319; 382/299; 358/406; 358/497
(58) Field of Search ..................... 382/190, 193, 382/318, 319, 289, 299, 298; 358/406, 474, 505, 506, 486, 451, 494, 497

(56) References Cited

U.S. PATENT DOCUMENTS

| | | | |
|---|---|---|---|
| 4,605,970 | * | 8/1986 | Hawkins .......................... 358/406 |
| 5,191,438 | * | 3/1993 | Katsurada et al. ................. 358/426 |
| 5,373,371 | * | 12/1994 | Masui ................................ 358/444 |
| 5,600,117 | * | 2/1997 | Sakamoto .......................... 235/456 |
| 5,870,508 | * | 2/1999 | Park .................................. 382/289 |

* cited by examiner

Primary Examiner—Amelia M. Au
Assistant Examiner—Mehrdad Dastouri

(57) ABSTRACT

A fast and effective method and an apparatus are provided for obtaining relative and absolute magnifying factors in the transverse and longitudinal directions to improve the scanning quality. The method for obtaining relative modifying factors includes the steps of (a) providing a first line segment, which extends in a direction other than either one of the first direction and the second direction, having a plurality of scanning points wherein there is a specific functional relationship between a distance in the first direction and a distance in the second direction of any two of the scanning points, (b) scanning the first line segment at a first one of the scanning points, (c) scanning the first line segment at a second one of the scanning points, wherein the first and the second scanning points have a particular position distance in the first direction, (d) obtaining a scanning distance between the first and the second scanning points in the second direction from the image scanning apparatus, and (e) calculating a relative modifying factor from the scanning distance and the particular position distance according the specific functional relationship. The method further provides a second line segment for obtaining an absolute magnifying factor in one of the first and second directions.

22 Claims, 8 Drawing Sheets

METHOD AND APPARATUS FOR OBTAINING RELATIVE AND ABSOLUTE MODIFYING FACTORS FOR IMAGE SCANNING APPARATUS

FIELD OF THE INVENTION

The present invention relates to a method and an apparatus for obtaining relative and absolute modifying factors in the first and the second directions, and especially to a method and an apparatus for obtaining the relative and absolute modifying factors in the transverse and the longitudinal directions for an image scanning apparatus.

BACKGROUND OF THE INVENTION

In recent years, an image scanner has become an indispensable peripheral equipment of personal computers. Many manufacturers are trying their best to improve the scanning quality.

In a scanner, the image-picking device including a series of lenses picks the image of an object in the transverse direction (or the horizontal direction). If the optical error of lens is ±1.0%, the magnification error in the transverse direction will be ±1.5%. Taking an A4 size document having a width of 210 mm for example, the scanned image will have a length error of 3.15 mm.

Furthermore, the driving device for driving the image-picking device also has a mechanical error in the moving direction of the image-picking device (or the longitudinal direction). For a scanner with a resolution of 600 dots per inch (DPI), the driving device will move the image-picking device 6000 steps for scanning a document with a length of 10 inches to obtain an image having 6000 dots in length. However, with a mechanical error of +1.0%, the driving device must move 6060 steps to finish the scanning process so that the length of the scanned image is up to 6060 dots, resulting in that the length of the scanned image is changed from 10 inches to 10.1 inches.

When the magnification errors in the transverse and longitudinal directions are not the same, the scanning image will be distorted. The magnification errors may come out after the scanner has used for a period of time or under the careless operation.

The main interest of the present invention is to provide an method and an apparatus for obtaining the relative and absolute modifying factors in the transverse and longitudinal directions for an image scanning apparatus. The method and apparatus can effectively correct the scanned image so as to improve the scanning quality.

SUMMARY OF THE INVENTION

An object of the present invention is to provide a method for obtaining a relative modifying factor in the first and second directions for an image scanning apparatus so as to eliminate the distortion of scanned images.

The method includes the steps of (a) providing a line segment, which extends in a direction other than either one of the first and the second directions, having a plurality of scanning points wherein there is a specific functional relationship between a distance in the first direction of and a distance in the second direction of any two of the scanning points, (b) scanning the line segment at a first one of the scanning points, (c) scanning the line segment at a second one of the scanning points, wherein there is a particular position distance in the first direction between the first and the second scanning points, (d) obtaining a scanning distance between the first and the second scanning points in the second direction from the image scanning apparatus, and (e) calculating the relative modifying factor from the scanning distance and the particular position distance according to the specific functional relationship.

In accordance with one aspect of the present invention, the specific functional relationship is a slope and the line segment intersects with a moving path of an image-picking device. The first direction is a moving direction of the image-picking device driven by a driving device and the second direction is a direction perpendicular to the first direction. Alternatively, the first direction and the second direction are the longitudinal direction and the transverse direction respectively. The first direction and the second direction are in a plane which is a scanning platform for placing thereon an object to be scanned.

Another object of the present invention is to provide a method for simultaneously obtaining absolute modifying factors in the first and second directions for an image scanning apparatus. This method not only eliminates the distortion of scanned images but also insures that the size of the scanned image is exactly the same as that of the original object.

The method includes the steps of (a) providing a line segment, which extends in a direction other than either one of the first and the second directions, having a plurality of scanning points wherein there is a specific functional relationship between a distance in the first direction of and a distance in the second direction of any two of the scanning points, (b) scanning the line segment at a first one of the scanning points, (c) scanning the line segment at a second one of the scanning points, wherein there is a particular position distance in the first direction between the first and the second scanning points, (d) obtaining a scanning distance between the first and the second scanning points in the second direction from the image scanning apparatus, and (e) calculating the relative modifying factor from the scanning distance and the particular position distance according to the specific functional relationship.

After the step (e), the method further includes the steps of (f) scanning the trapezoid pattern at the upper base, (g) scanning the trapezoid pattern at the lower base, (h) obtaining a moving length between the upper base and the lower base in the first direction, (i) comparing the height with the moving length to obtain an absolute modifying error in the first direction, and k) obtaining absolute modifying factors in the first and the second directions simultaneously from the absolute modifying error and the relative modifying factor.

According to the above-mentioned embodiment, the image scanning apparatus further includes a trapezoid pattern with a first color and a background with a second color forming therebetween an oblique boundary line served as the line segment, wherein the trapezoid pattern has an upper base and a lower base which are parallel to the second direction, and has a height in the first direction. Preferably, the first color is black and the second color is white.

In another embodiment, the method for simultaneously obtaining absolute modifying factors in a first and a second directions for an image scanning apparatus includes the steps of (a) providing a first line segment, which extends in a direction other than either one of the first direction and the second direction, having a plurality of scanning points wherein there is a specific functional relationship between a distance in the first direction and a distance in the second direction of any two of the scanning points, (b) providing a second line segment having a particular length in the second direction, (c) scanning the first line segment at a first one of the scanning points, (d) scanning the first line segment at a second one of the scanning points, wherein the first and the second scanning points have a particular position distance in the first direction, (e) obtaining a scanning distance between the first and the second scanning points in the second direction from the image scanning apparatus, (f) scanning the second line segment to obtain a scanning length in the second direction, (g) comparing the particular length with the scanning length to obtain an absolute modifying error in the second direction, (h) calculating a relative modifying factor from the scanning distance and the particular position distance in the specific functional relationship, and (i) obtaining the absolute modifying factors in the first and the second directions simultaneously from the absolute modifying error and the relative modifying factor.

According to the above-mentioned method, the image scanning apparatus further includes a first marking pattern with a first color and a background with a second color forming therebetween an oblique line segment served as the first line segment and a second marking pattern having a third color forming the second line segment between the background.

Alternately, the image scanning apparatus further includes a black right-angled trapezoid pattern and a white background forming therebetween an oblique line segment served as the first line segment and a height in the second direction served as the second line segment.

Preferably, the image scanning apparatus further includes a black right triangular pattern and a black rectangular pattern in a white background, wherein the triangular pattern and the background forming therebetween a hypotenuse served as the first line segment and the rectangular pattern and the background forming therebetween a borderline in the second direction served as the second line segment.

A further object of the present invention is to provide an image scanning apparatus having a relative modifying factor in the first and second directions.

The image scanning apparatus includes an image-picking device for picking digital data representative of an image, a driving device connected to the image-picking device for driving the image-picking device to move in the first direction, a scanning platform for placing thereon an object to be scanned, and a first modifying device formed on the scanning platform for obtaining the relative modifying factor wherein the first modifying device extends in a direction other than either one of the first direction and the second direction and has a plurality of scanning points, any two of which have a specific functional relationship between a distance in the first direction and a distance in the second direction.

According to the above-mentioned image scanning apparatus, the image scanning apparatus further includes a first marking pattern with a first color and a background with a second color forming therebetween a borderline served as the first modifying device. Alternatively, the image scanning apparatus further includes a black triangular pattern and a white background forming therebetween an oblique line segment served as the first modifying device. Preferably, the oblique line segment has a slope which is equal to one.

The image scanning apparatus is one selected from a group consisting of an image scanner, a photocopier, and a fax machine. The image-picking device of the image scanning apparatus is a charge coupled device (CCD).

Another further object of the present invention is to provide an image scanning apparatus having absolute modifying factors in the first and second directions.

The image scanning apparatus includes an image-picking device for picking digital data representative of an image, a driving device connected to the image-picking device for driving the image-picking device to move in the first direction, a scanning platform for placing thereon an object to be scanned, a first modifying device formed on the scanning platform for obtaining the relative modifying factor wherein the first modifying device extends in a direction other than either one of the first direction and the second direction and has a plurality of scanning points, any two of which have a specific functional relationship between a distance in the first direction and a distance in the second direction, and a second modifying device formed on the scanning platform for simultaneously obtaining absolute modifying factors in the first and the second directions wherein the second modifying device has a particular length and extends along one of the first direction and the second direction.

According to the fourth aspect of the present invention, the image scanning apparatus further includes a black right-angled trapezoid pattern and a white background forming therebetween an oblique line segment served as the first modifying device and a height served as the second modifying device.

The present invention may best be understood through the following description with reference to the accompanying drawings, wherein:

DETAILED DESCRIPTION OF THE PREFERRED EMBODIMENTS

Figure 1:
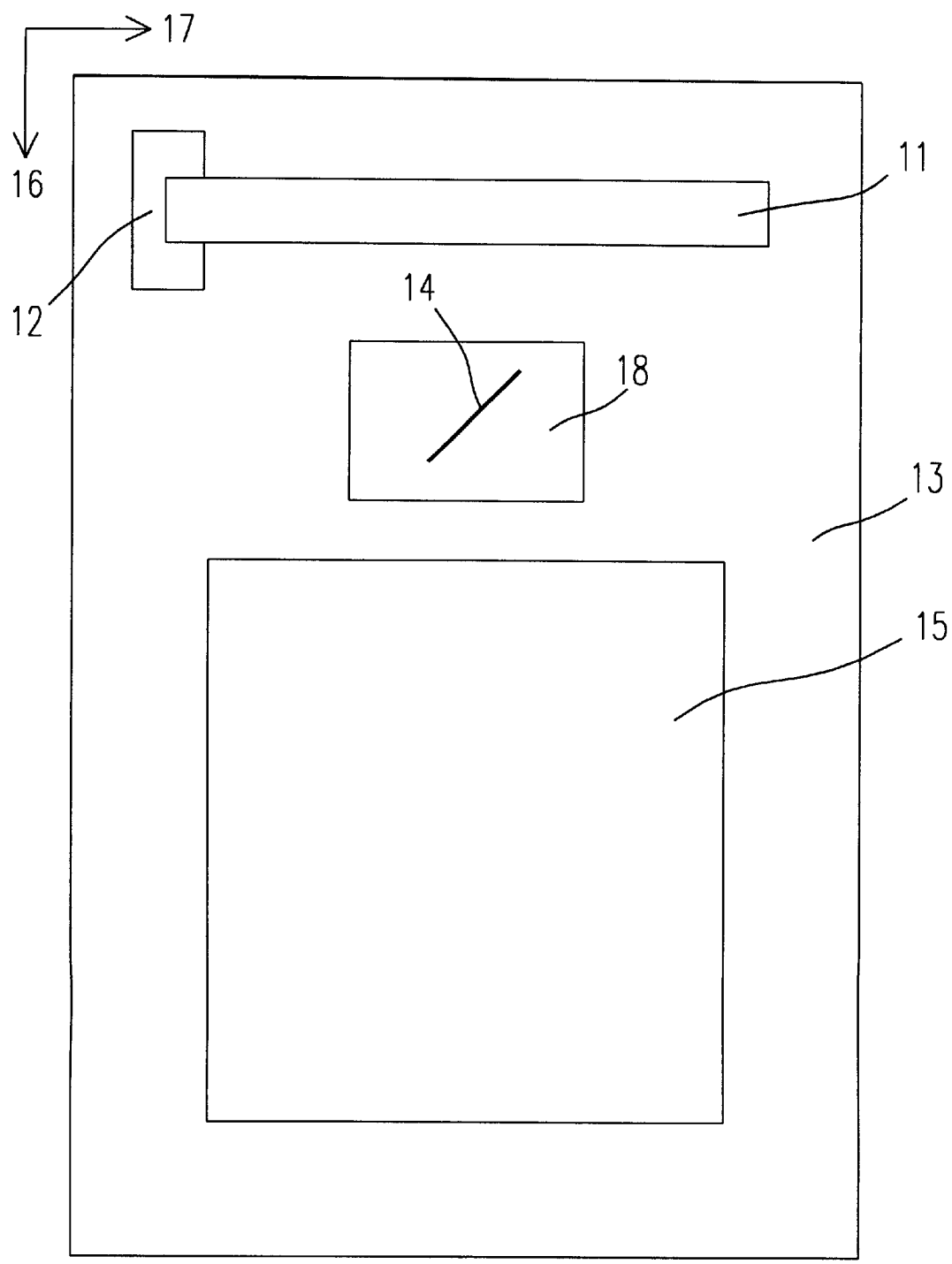
FIG. 1 is a schematic diagram showing the preferred embodiment of a scanner having the relative modifying factor according to the present invention.

Please refer to FIG. 1 schematic showing an image scanning apparatus having the relative modifying factor in the first direction 16 and the second direction 17 according to the present invention. The image-picking device 11 is used for picking digital data representative of an image, and the driving device 12 is connected to the image-picking device 11 for driving the image-picking device 11 to move in the first direction 16. The background 18 and the first modifying device 14 are on the scanning platform 13 for placing thereon an object 15 to be scanned. The background and the first modifying device is on the moving path of the image-picking device 11 and their colors have to be distinguished easily by the image-picking device 11. The image-picking device is usually a charge coupled device (CCD). The first modifying device 14 is a first line segment 14 extending in a direction other than either one of the first direction 16 and the second direction 17. The first line segment 14 is composed of a plurality of scanning points and has a slope. Any two of the scanning points have a specific functional relationship between a distance in the first direction 16 and a distance in the second direction 17 because of the slope.

Figure 2:
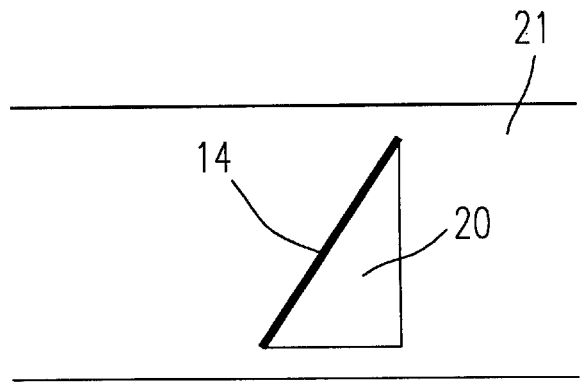
FIG. 2 is a schematic diagram showing the modifying device of the present invention.
Figure 3A:
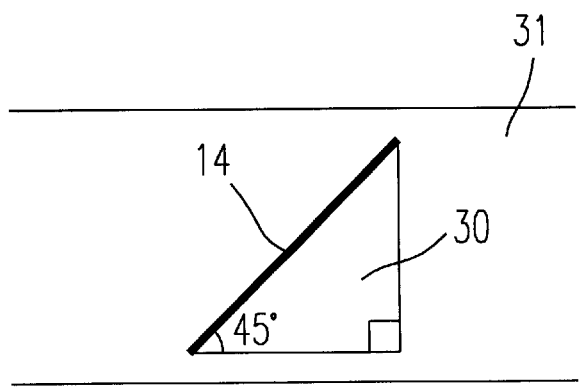
FIGS. 3(a) and 3(b) are schematic diagram showing the preferred embodiment of the modifying device in a form of a right triangle according to the present invention.
Figure 3B:
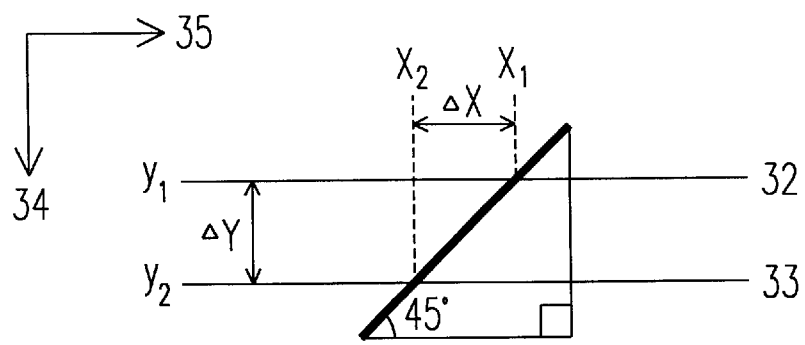

The first modifying device 14, or the first line segment 14, however, can be any oblique edge of any pattern on a background, such as triangular pattern and tetragonal pattern. The pattern and the background have better to be two different colors which are distinguished easily by the image-picking device. While the driving device 12 drives the image-picking device 11 to scan the object 15, the pattern is also scanned. Taking the triangular pattern 20, as shown in FIG. 2, for example, the first modifying device 14 is an oblique borderline between the black triangular pattern 20 and the white background 21. In the preferred embodiment of the present invention shown in FIG. 3, the first line segment 14 is a borderline between a black right triangle 30 and a white background 31. After the scanner scans the first line segment 14 at a first scanning position 32 for obtaining a first scanning point x1, the driving device 12 drives the image-picking device to move a distance $\Delta Y$ in the longitudinal direction 34 and the scanner scans the first line segment 14 at a second scanning position 33 for obtaining a second point x2. The distance in the transverse direction 35 between x1 and x2 is $\Delta X$. Because the slope of the first line segment 14 in the right triangle 30 is one and the slope is related to the specific functional relationship, the distance of any two points in the longitudinal direction 34 should be equal to that in the transverse direction 35, i.e. $\Delta X = \Delta Y$. If the distance between $\Delta X$ is not equal to $\Delta Y$, i.e. $\Delta X \neq \Delta Y$ or $\Delta X - \Delta Y = \epsilon$, the relationship between the distance in the longitudinal and the transverse directions can be used for correcting the scanned image. The relationship is called as the relative modifying factor. For example, if the scanner detects the distance between x1 and x2 in the longitudinal direction is 1% shorter than that in the transverse direction, the scanner will correct the lengths of the scanned image by increasing 1% in length in the longitudinal direction or reducing 1% in length in the transverse direction in order to output the scanned image without distortion.

For a scanner having a resolution 600 dot per inch (DPI) in both of the transverse and longitudinal directions, if the driving device 12 drives the image-picking device 11 to move 1 inch from a first scanning point to a second scanning point by 600 steps representative of 600 dots in the longitudinal direction, i.e. $\Delta Y = 600$ dots, and the image-picking device picks 600 dots in the transverse direction between those two points, i.e. $\Delta X = 600$ dots, there is no magnification error between the longitudinal and the transverse direction. However, if the driving device 12 drives the image-picking device 11 to move 600 steps in the longitudinal direction, i.e. $\Delta Y = 600$ dots, and the distance in the transverse direction detected by the image-picking device is 660 dots, i.e. $\Delta X = 660$ dots, the scanning image is distorted and there is a relative modifying factor which is $\Delta X:\Delta Y=1:1.1$. The scanner will correct the scanning image by inserting points in the transverse direction or erasing points in the longitudinal direction. These techniques are easily understood by those skilled in the art.

Figure 4:
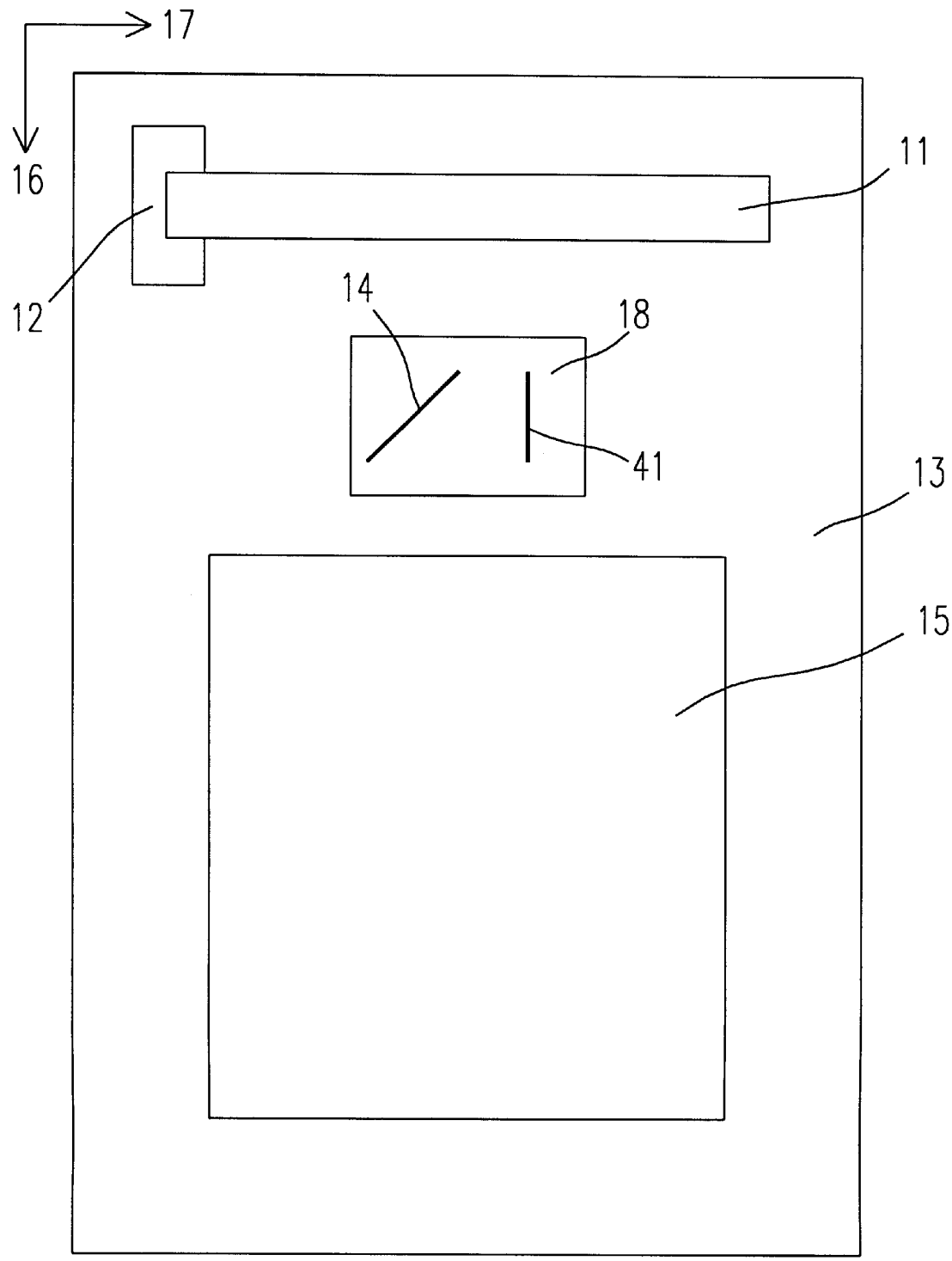
FIG. 4 is a schematic diagram showing the first preferred embodiment of a scanner having the relative and absolute modifying factors according to the present invention.

However, the above-described method can just get the relative modifying factor and make the scanning image undistorted. The size of the scanning image can not be the same as the original image. A second modifying device for obtaining absolute modifying factors in the longitudinal and transverse directions will be further included in a scanner to achieve this purpose. The relative modifying factor is a ratio of the magnification in the longitudinal direction to that in the transverse direction because the values in both directions are only relative. If the absolute value in any one of those two directions is determined, both of the absolute values in those two direction is obtained. The second modifying device is used for obtaining the absolute value in any one of the longitudinal and transverse directions. Please refer to FIG. 4 which schematically shows the first preferred embodiment of a scanner having the relative and absolute modifying factors in the transverse and longitudinal directions according to the present invention. The first modifying device 14 (or the first line segment 14) and the second modifying device 41 are both on the background 18. The second modifying device 41 is a line segment extending along the first direction 16. It should be noticed that the first modifying device 14 is used for obtaining the relative modifying factor and the second modifying device 41 is used for incorporating the first modifying device 14 to obtain the absolute modifying factors. In other words, the second modifying device can obtain the absolute modifying factors after the first modifying device has obtained the relative modifying factor.

Figure 5A:
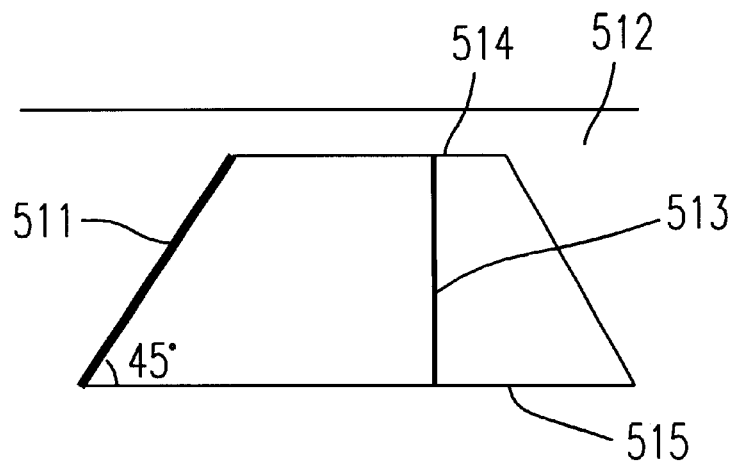
FIGS. 5(a) and 5(b) are schematic diagram showing the first preferred embodiment of the first modifying device and the second modifying device in a form of a trapezoid pattern according to FIG. 4.
Figure 5B:
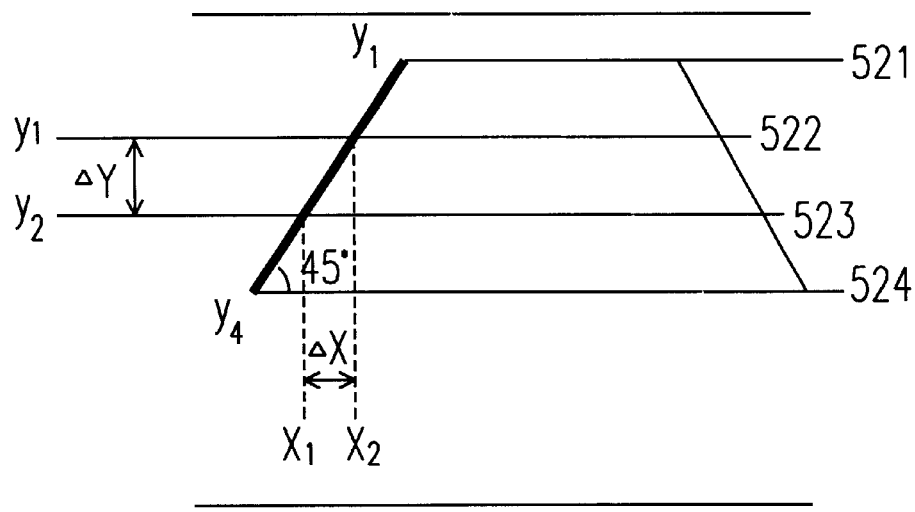
Figure 6:
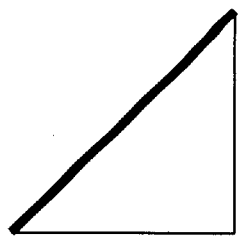
FIG. 6 is a schematic diagram showing other patterns consisting of the first modifying device and the second modifying device according to FIG. 4.
Figure 6:
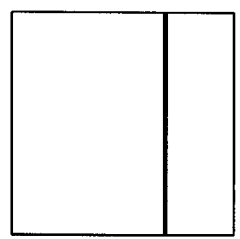
Figure 6:
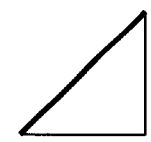
Figure 6:
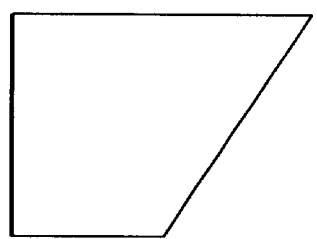
Figure 6:
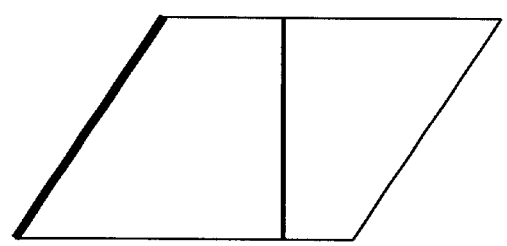
Figure 6:
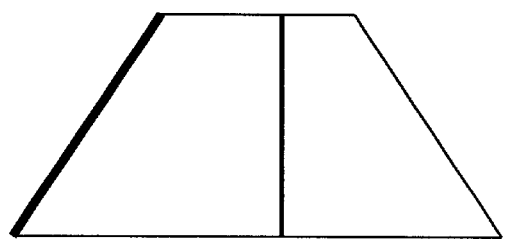
Figure 6:
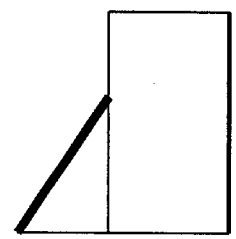
Figure 6:
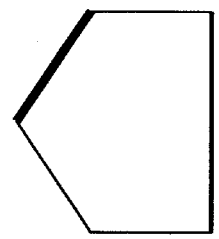
Figure 6:
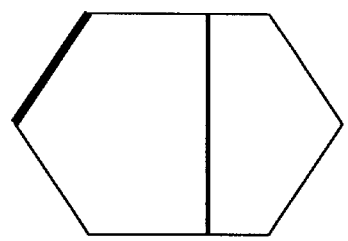

The first and second modifying devices can be contained in any pattern which has an oblique edge, such as trapezoid pattern and parallelogram pattern. FIG. 5 schematically shows the preferred embodiment of the first modifying device 511 (or first line segment 511) and the second modifying device 513 (or second line segment 513) in a form of a black trapezoid pattern on a white background 512 according to the present invention. The first line segment 511 is an oblique line segment having a slope which is equal to one. The second line segment 513 is the height between the upper base 514 and the lower base 515 and has a particular length. For a scanner with a resolution of 600 DPI in both of the transverse and longitudinal directions and the second line segment having particular length equal to 1 inch, the driving device 12 drives the image-picking device 11 (usually a CCD) to move from a first scanning position 521 to the second, third, and fourth scanning positions 522, 523, 524. The second and third scanning positions 522, 523 can be used for obtaining the relative modifying factor by the same method described above. If there is a moving step of 540 steps between the first and the fourth scanning positions 521, 524, the absolute magnification error in the longitudinal direction is −10% by comparing with the particular length. Then, the absolute modifying factors in both of the longitudinal direction and the transverse direction can be obtained from the relative modifying factor and the absolute magnification error in the longitudinal direction. For example, if the relative modifying factor is 1:1.1 (the longitudinal direction : the transverse direction) the absolute modifying factor in the transverse direction is −11%. FIG. 6 schematically shows other patterns consisting of the first modifying device and the second modifying device according to FIG. 4, such as trapezoid pattern, parallelogram, triangular pattern with rectangular pattern, and so on.

Figure 7:
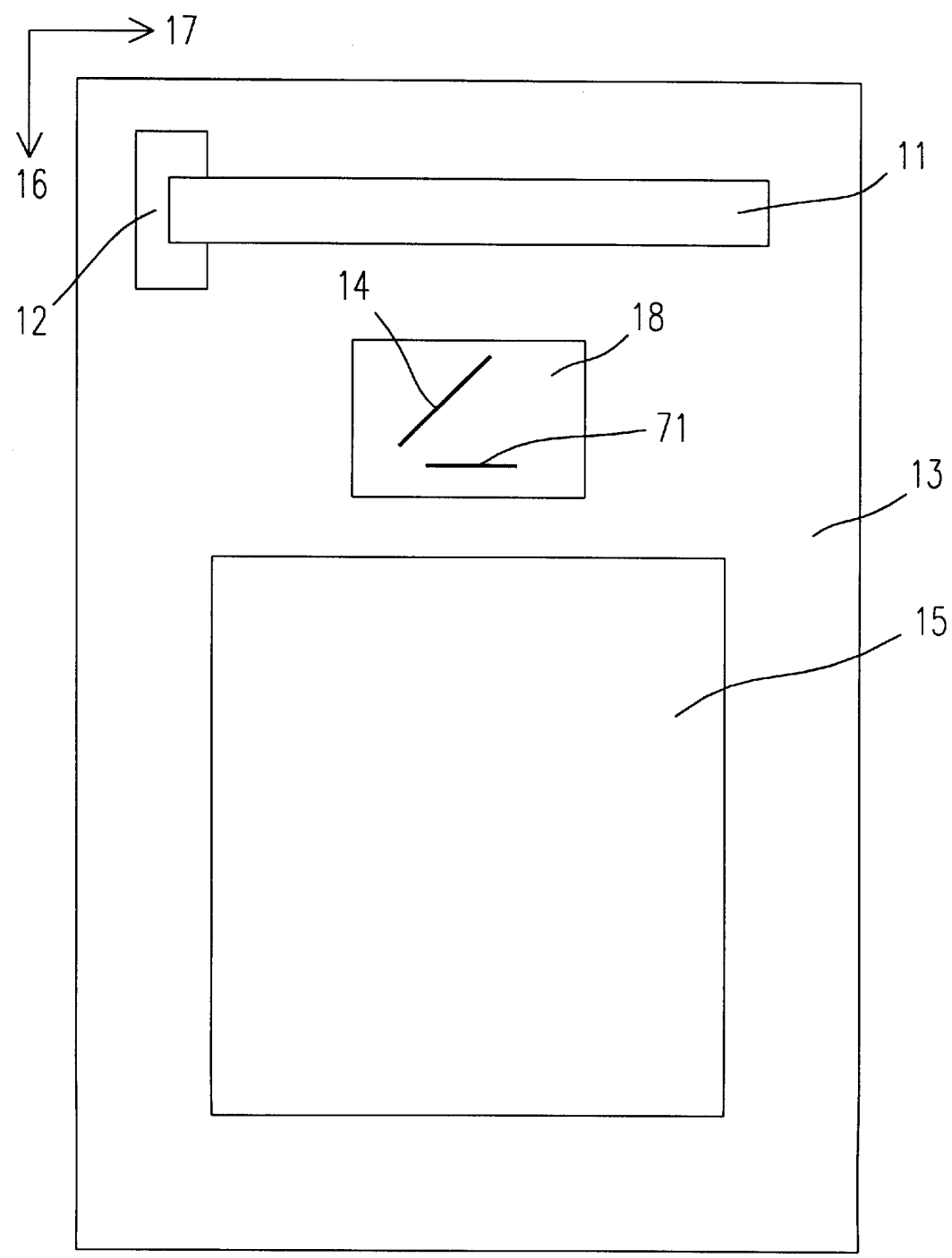
FIG. 7 is a schematic diagram showing the second preferred embodiment of a scanner having the relative and absolute modifying factors according to the present invention.
Figure 8A:
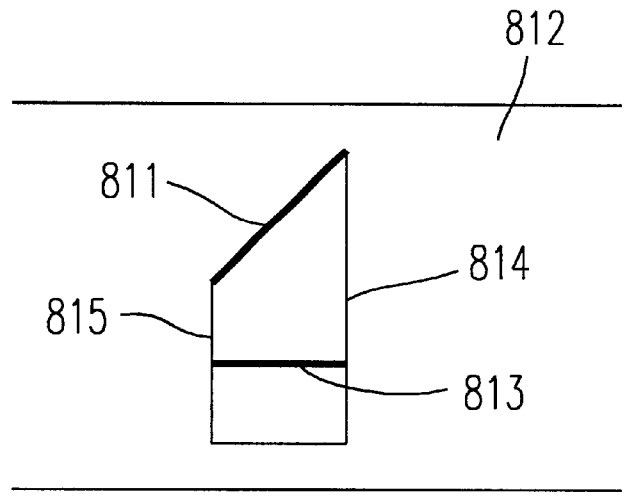
FIGS. 8(a) and 8(b) are schematic diagram showing the second preferred embodiment of the first modifying device and the second modifying device in a form of a trapezoid pattern according to FIG. 7.
Figure 8B:
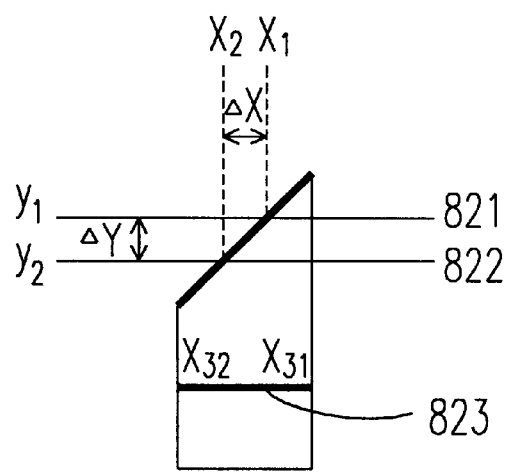
Figure 9:
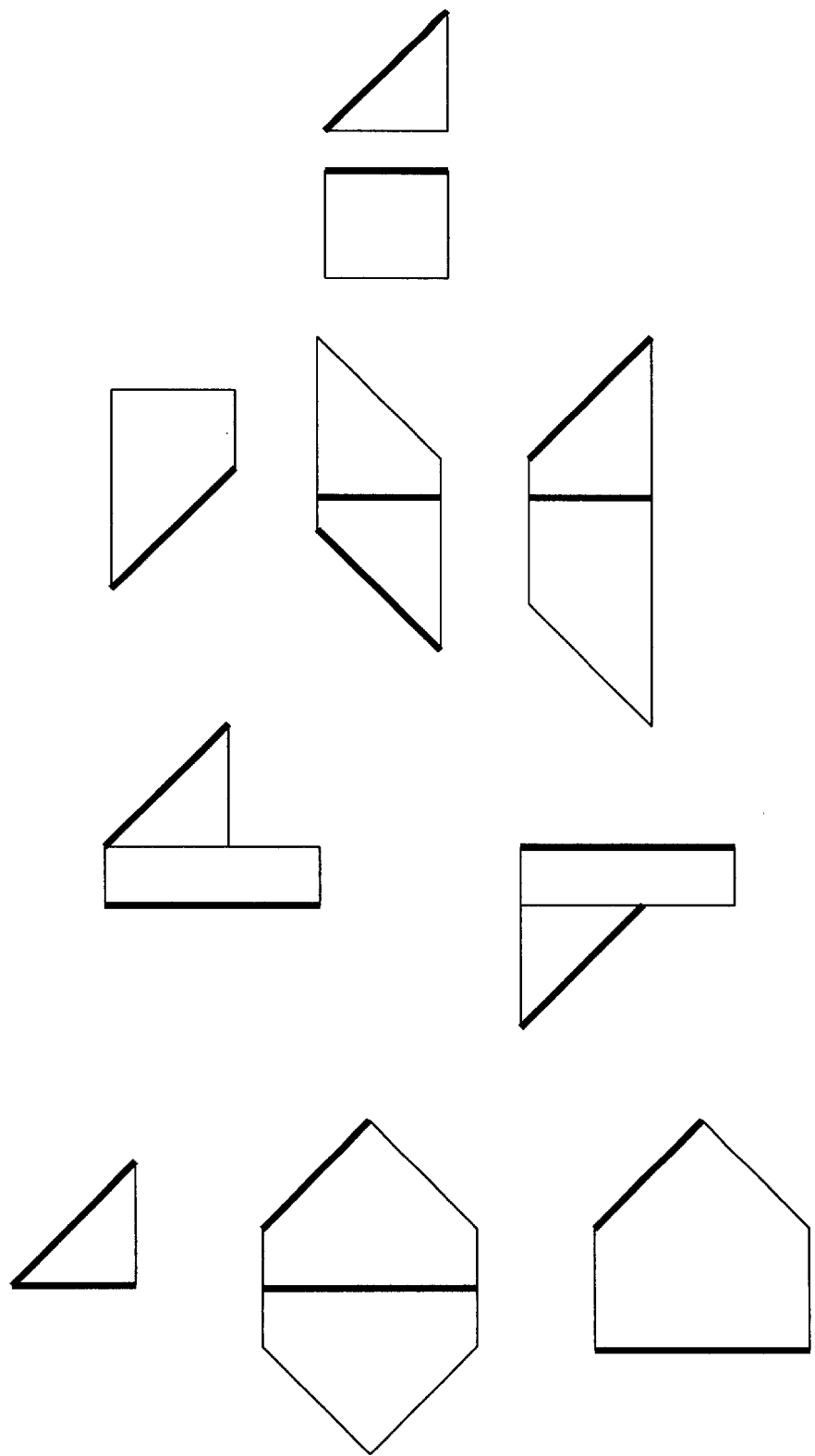
FIG. 9 is a schematic diagram showing other patterns consisting of the first modifying device and the second modifying device according to FIG. 7.

FIG. 7 schematically shows the second preferred embodiment of a scanner having the relative and absolute modifying factors in the first and second directions according to the present invention. The second modifying device 71 is a line segment extending along the second direction 17 in this case. When a scanner has the second modifying device extending in the second direction, the scanning process for obtaining the absolute modifying factors is a little different from that with the first modifying device extending in the first direction. FIG. 8 schematically shows the preferred embodiment of the first line segment 811 and the second line segment 813 in a form of a black trapezoid pattern on a white background 812 according to FIG. 7. The first line segment 811 is an oblique line segment having a slope which is equal to one. The second line segment 813 is the height between the upper base 814 and the lower base 815 and has a particular length. For a scanner having a resolution of 600 DPI in both of the transverse and longitudinal directions and the second line segment having particular length equal to 1 inch, the driving device 12 drives the image-picking device 11 (usually a CCD) to move from the first scanning position 821 to the second and third scanning positions 822, 823. The first and the second scanning position 821, 822 can be used for obtaining the relative modifying factor by the same method described above. When the scanner scans at the third scanning position 823, the scanner detects two special points x22 and x23. These two points are the changing points between the black pattern and the white background and are easily detected. If the height between point x31 and x32 detected by the image-picking device is 540 dots in the transverse direction, the absolute magnification error in the transverse direction is −10% by comparing the height with the particular length. Then, the absolute modifying factors in both of the longitudinal direction and the transverse direction can be obtained from the relative modifying factor and the absolute magnification error in the transverse direction. For example, if the relative modifying factor is 1:1.1 (the longitudinal direction: the transverse direction) the absolute modifying factor in the longitudinal direction will be −9.09%. FIG. 9 schematically shows other patterns consisting of the first modifying device and the second modifying device according to FIG. 7, such as trapezoid pattern, parallelogram, triangular pattern with rectangular pattern, and so on.

The method for obtaining relative and absolute modifying factors can be executed before each time of scanning and can be applied to an image scanner, a photocopier, or a fax machine. The pattern and the background have different colors which are easily distinguished by the image-picking device. With these methods and apparatus, the magnification errors can be easily rectified to the best state even after being used for a period of time or under the careless operation.

While the invention has been described in terms of what are presently considered to be the most practical and preferred embodiments, it is to be understood that the invention need not limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for obtaining a relative modifying factor of magnification in a first and a second directions for an image scanning apparatus comprising steps of:

(a) providing a line segment on said image scanning apparatus, which extends in a direction other than either one of said first and said second directions, having a plurality of scanning points wherein there is a specific functional relationship between a distance in said first direction of and a distance in said second direction of any two of said scanning points;

(b) scanning said line segment at a first one of said scanning points;

(c) scanning said line segment at a second one of said scanning points, wherein there is a particular position distance detected in said first direction between said first and said second scanning points;

(d) obtaining a scanning distance between said first and said second scanning points in said second direction counted by said image scanning apparatus; and (e) calculating said relative modifying factor by comparing said detected particular position distance with another particular position distance derived from said counted scanning distance according to said specific functional relationship.

2. The method according to claim 1 wherein said specific functional relationship is a slope.

3. The method according to claim 1 wherein said line segment intersects with a moving path of an image-picking device.

4. The method according to claim 3 wherein said first direction is a moving direction of said image-picking device driven by a driving device.

5. The method according to claim 1 wherein said first direction and said second direction are a longitudinal direction and a transverse direction respectively.

6. The method according to claim 1 wherein said first direction and said second direction are in a plane which is a scanning platform for placing thereon an object to be scanned.

7. The method according to claim 1 wherein said image scanning apparatus further comprises a marking pattern with a first color and a background with a second color, forming therebetween a borderline served as said line segment.

8. The method according to claim 1 wherein said image scanning apparatus further comprises a black triangular pattern and a white background, forming therebetween an oblique boundary line served as said line segment.

9. The method according to claim 1 wherein said image scanning apparatus further comprises a trapezoid pattern with a first color and a background with a second color, forming therebetween a height in said first direction and an oblique boundary line served as said line segment, wherein said trapezoid pattern has an upper base and a lower base which are parallel to said second direction.

10. The method according to claim 9, after said step (e), further comprising steps of:

(f) scanning said trapezoid pattern at said upper base;

(g) scanning said trapezoid pattern at said lower base;

(h) obtaining a moving length between said upper base and said lower base in said first direction;

(i) comparing said height with said moving length to obtain an absolute modifying error in said first direction; and (j) obtaining absolute modifying factors in said first and said second directions simultaneously from said absolute modifying error and said relative modifying factor.

11. The method according to claim 9 wherein said first color is black and said second color is white.

12. A method for simultaneously obtaining absolute modifying factors in a first and a second directions for an image scanning apparatus comprising steps of:

(a) providing a first line segment, which extends in a direction other than either one of said first direction and said second direction, having a plurality of scanning points wherein there is a specific functional relationship between a distance in said first direction and a distance in said second direction of any two of said scanning points;

(b) providing a second line segment having a particular length in said second direction;

(c) scanning said first line segment at a first one of said scanning points;

(d) scanning said first line segment at a second one of said scanning points, wherein said first and second scanning points have a particular position distance in said first direction;

(e) obtaining a scanning distance between said first and said second scanning points in said second direction from said image scanning apparatus;

(f) scanning said second line segment to obtain a scanning length in said second direction;

(g) comparing said particular length with said scanning length to obtain an absolute modifying error in said second direction;

(h) calculating a relative modifying factor from said scanning distance and said particular position distance in said specific functional relationship; and (i) obtaining said absolute modifying factors in said first and said second directions simultaneously from said absolute modifying error and said relative modifying factor.

13. The method according to claim 12 wherein said image scanning apparatus further comprises:

a first marking pattern with a first color and a background with a second color forming therebetween an oblique line segment served as said first line segment; and a second marking pattern having a third color forming said second line segment between said background.

14. The method according to claim 12 wherein said image scanning apparatus further comprises a black right-angled trapezoid pattern and a white background, forming therebetween an oblique line segment served as said first line segment and a height in said second direction served as said second line segment.

15. The method according to claim 12 wherein said image scanning apparatus further comprises a black right triangular pattern and a black rectangular pattern in a white background, wherein there is a hypotenuse formed between said triangular pattern and said background to serve as said first line segment, and a borderline in said second direction formed between said rectangular pattern and said background to serve as said second line segment.

16. An image scanning apparatus having a relative modifying factor in a first and a second directions comprising:

an image-picking device for picking digital data representative of an image;

a driving device connected to said image-picking device for driving said image-picking device to move in said first direction;

a scanning platform for placing thereon an object to be scanned;

a first modifying device formed on said scanning platform for obtaining said relative modifying factor wherein said first modifying device extends in a direction other than either one of said first direction and said second direction and has a plurality of scanning points, any two of which have a specific functional relationship between a distance in said first direction and a distance in said second direction; and a second modifying device formed on said scanning platform for simultaneously obtaining absolute modifying factors in said first and said second directions wherein said second modifying device has a particular length and extends alone one of said first direction and said second direction.

17. The image scanning apparatus according to claim 16 further comprising a first marking pattern with a first color and a background with a second color forming therebetween a borderline served as said first modifying device.

18. The image scanning apparatus according to claim 16 further comprising a black triangular pattern and a white background forming therebetween an oblique line segment served as said first modifying device.

19. The image scanning apparatus according to claim 16 further comprising a black right triangle and a white background forming therebetween a hypotenuse served as said first modifying device having a slope which is equal to one.

20. The image scanning apparatus according to claim 16 wherein said image-picking device is a charge coupled device (CCD).

21. The image scanning apparatus according to claim 16 is one selected from a group consisting of an image scanner, a photocopier, and a fax machine.

22. The image scanning apparatus according to claim 16 further comprising a black right-angled trapezoid pattern and a white background forming therebetween an oblique line segment served as said first modifying device and a height served as said second modifying device.

* * * * *

UNITED STATES PATENT AND TRADEMARK OFFICE
CERTIFICATE OF CORRECTION

PATENT NO. : 6,278,808 B1
DATED : August 21, 2001
INVENTOR(S) : Tsai et al.

Page 1 of 1

It is certified that error appears in the above-identified patent and that said Letters Patent is hereby corrected as shown below:

<u>Column 10,</u>
Line 25, delete "alone" and insert -- along --.

Signed and Sealed this

Twenty-first Day of May, 2002

*Attest:*

*Attesting Officer*

JAMES E. ROGAN
*Director of the United States Patent and Trademark Office*